United States Patent [19]

De Jesus

[11] 3,774,517

[45] Nov. 27, 1973

[54] NON-BOUNCING HINGED FLARE BAFFLE

[75] Inventor: Charles De Jesus, Watertown, Mass.

[73] Assignee: Polaroid Corporation, Cambridge, Mass.

[22] Filed: Apr. 24, 1972

[21] Appl. No.: 246,890

[52] U.S. Cl. ............................................... 95/42
[51] Int. Cl. ........................................ G03b 19/12
[58] Field of Search ...................... 95/42, DIG. 2; 16/191

[56] References Cited
UNITED STATES PATENTS

| | | | |
|---|---|---|---|
| 3,447,437 | 6/1969 | Tiffany | 95/42 |
| 3,601,027 | 8/1971 | Ono | 95/42 |
| 2,388,021 | 10/1945 | Thomas | 16/191 |

Primary Examiner—Samuel S. Matthews
Assistant Examiner—Michael D. Harris
Attorney—Frederick H. Brustman et al.

[57] ABSTRACT

The present invention concerns a hinged flare baffle for use in a reflex camera. It incorporates a detent mechanism that inhibits the bouncing of the flare baffle without positively locking the flare baffle in its uppermost position. A spring rapidly rotates the flare baffle upward against a stop. As the flare baffle reaches the stop, the detent engages a cavity to prevent the flare baffle's bouncing back from the stop and into the camera's optical path due to the impact. A capping plate presses down on the flare baffle overpowering the detent mechanism and causing it to disengage as the reflex camera changes to a focusing mode of operation.

7 Claims, 3 Drawing Figures

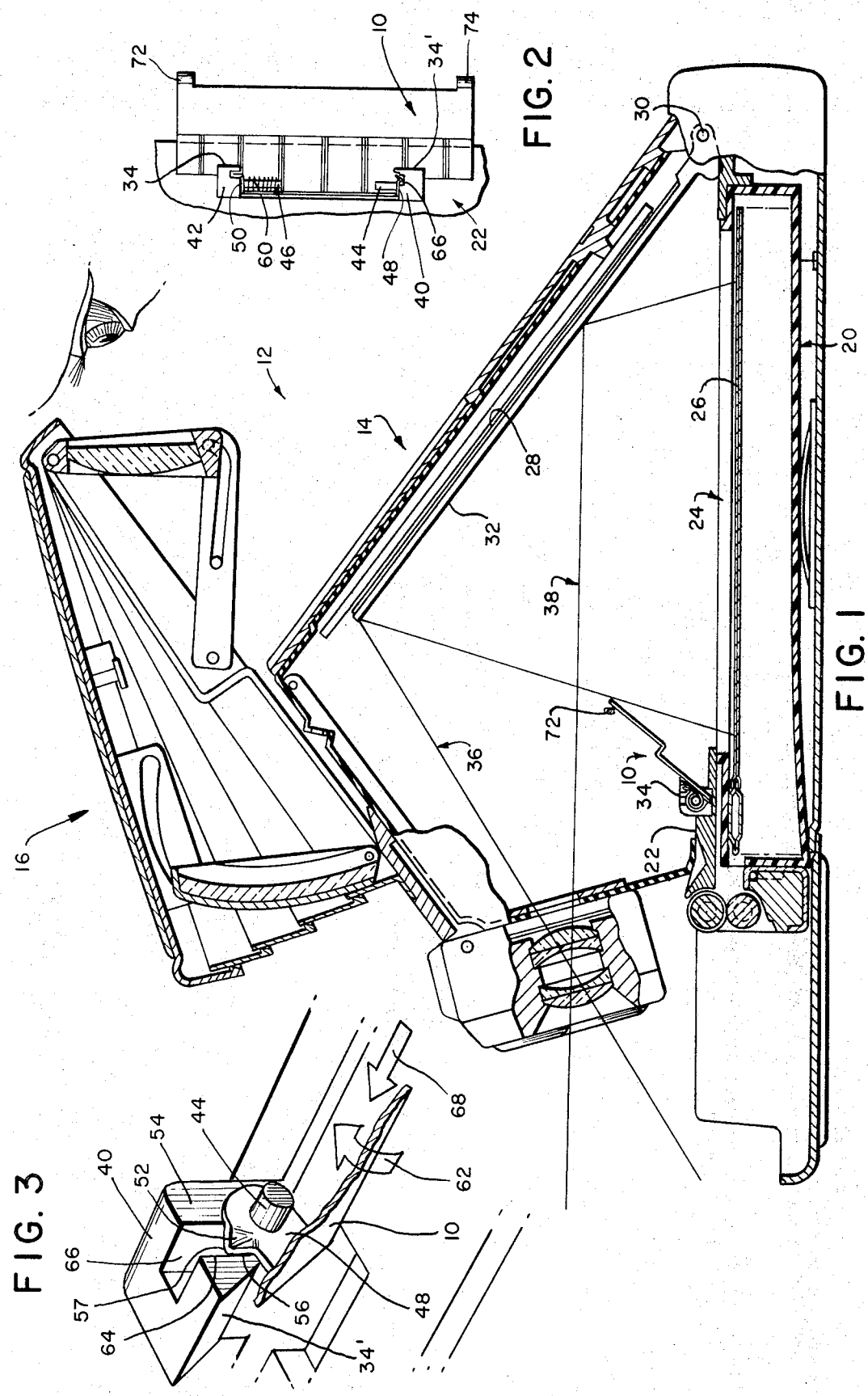

NON-BOUNCING HINGED FLARE BAFFLE

BACKGROUND OF THE INVENTION

The present invention relates to an improvement for a hinged flare baffle, for use in a reflex camera, of the type described in copending U. S. Pat. application, Ser. No. 150,675, filed June 7, 1971, and assigned to Polaroid Corporation.

The flare baffle described in that patent application is hinged so it will rotate upwardly from a first position until it stops at a second position. In the first position, it forms a part of a light seal that prevents light from striking a photosensitive surface on a film unit stored in a cassette inside the reflex camera. In the second position, the flare baffle prevents light entering through the camera's objective lens from reaching the film unit except via a reflex mirror inside the camera.

A capping plate, also protecting the photosensitive surface, holds the flare baffle down in the first position. When the capping plate uncovers the photosensitive surface to allow taking a photograph, it releases the flare baffle. A spring rapidly rotates the flare baffle upward to the second position. At its uppermost point of rotation, the flare baffle strikes against a stop, situated on a frame member of the reflex camera, that prevents it from rotating past the second position.

Under certain circumstances, the impact of the flare baffle against the stop causes the flare baffle to bounce back from the stop far enough for the outermost edge of the flare baffle to enter the optical path of the reflex camera.

The proper sequence of operations for the reflex camera causes the shutter to open just after the capping plate uncovers the photosensitive surface. Unless the reflex camera contains some means for quickly arresting the bouncing of the flare baffle, or for preventing the flare baffle from bouncing at all, the outermost edge of the flare baffle might interfere with the optical path when the shutter opens, thereby obscuring a portion of the photographic field.

SUMMARY OF THE INVENTION

The present invention provides a means for preventing the flare baffle from bouncing backward when it strikes the stop limiting its upward motion and thereby obscuring part of the picture formed in the reflex camera.

A frame member of the reflex camera has a pair of bearing blocks or supports positioned adjacent to one edge of an opening in the frame member. Each bearing block supports one of a pair of coaxial shafts about which the flare baffle rotates. One or both of the bearing blocks has a recess or cavity, in the face the axle projects from, into which a detent can move.

A pair of axially aligned bearing tabs project from the flare baffle. They fit over the coaxial shafts so as to rotatably support the flare baffle on the shafts. The bearing tab proximate the support with the cavity has a detent extending axially toward the face of that bearing block so the detent might engage the cavity.

A coil spring, mounted on one of the shafts, rotates the flare baffle from its lowermost position to its uppermost position whence it strikes against the bearing blocks. The bearing blocks or supports act as stops for the flare baffle at the end of its upward rotation. The coil spring also urges the flare baffle in an axial direction so the detent bears against the face of the adjacent bearing block. This causes the detent to enter the cavity as they align with each other. The detent and cavity are positioned so they will fully engage when the flare baffle arrives in its uppermost position. The impact momentum derived by the flare baffle on striking the stops (bearing blocks) is insufficient to overcome the axial force of the spring that causes the detent to engage the cavity. Therefore, the flare baffle will not bounce backward to obstruct the camera's field during an exposure.

The flare baffle can be moved downward when desired by applying additional force, such as provided by the return of a capping plate to its lower position, to overcome the engaging force due to the spring.

Accordingly, it is an object of the present invention to provide a means for inhibiting the bouncing of a flare baffle in a reflex camera.

Another object of the present invention is to provide a mechanism for locking a rotatable flare baffle in its uppermost position against an impact momentum force tending to make the flare baffle bounce.

DESCRIPTION OF THE DRAWINGS

Other objects and many of the attendant advantages of the present invention will be better appreciated and said invention will be clearly understood by reference to the following detailed description when considered in conjunction with the accompanying drawings illustrating one embodiment of the instant invention, wherein:

FIG. 1 illustrates in cross-section detail a reflex camera embodying the present invention;

FIG. 2 illustrates in a plan view a flare baffle according to the present invention in its lowermost position; and FIG. 3 illustrates in detail a detent preparatory to engaging a cavity in a bearing block, together with arrows indicating the principal movements of a flare baffle.

DESCRIPTION OF THE PREFERRED EMBODIMENT

FIG. 1 illustrates the relation of the flare baffle 10 to the other components of the reflex camera 12. The components of principal interest to an understanding of the present disclosure are in the housing 14.

The housing 14 contains an objective lens 18 in a forward wall and a film cassette 20 situate inside the housing 14 below a frame member 22. The frame member 22 extends approximately the length and width of the housing 14's interior. A large rectangular opening 24 in the frame member 22 permits light to reach the photosensitive surface of the uppermost film unit 26 in the cassette 20.

Between photographic exposures, a capping plate 28 covers the opening 24 to protect the uppermost film unit 26 from inadvertent exposure to light. For this purpose, it overlaps and interacts with the flare baffle 10 as described in the aforementioned U. S. Pat. application, Ser. No. 150,675. The capping plate 28 pivots about an axis 30 located at the rear end of the frame member 22. The upward rotation of the capping plate 28 carries a reflex mirror 32, attached to the underside of the capping plate 28, into a position from which the reflex mirror 32 reflects an image formed by the objective lens 18 into the uppermost film unit 26. As the capping plate 28 rotates upward, it releases the flare baffle 10 for upward rotation, in the direction of the arrow, to the position illustrated where the flare baffle 10 strikes the stop 34.

In its uppermost position, the flare baffle 10 permits the passage without interference of an image from the objective lens 18 to the film unit 26 via the reflex mirror 32. A pair of diverging light rays 36 and 38 indicate the camera's angular field of view. They also fairly well denote the region that the flare baffle 10 is prohibited from, during exposure, to prevent it from obscuring a portion of the camera's field. The stop 34 prevents the flare baffle 10 from rotating upwardly so far as to interfere with light ray 38. However, in the absence of the present invention, the impact of the flare baffle 10 against the stop 34 causes the flare baffle 10 to bounce backward and interfere with the light ray 36 while the camera's shutter (not shown) is open for an exposure.

The means that inhibits the flare baffle from bouncing backward appears clearly in FIG. 2. Two opposed bearing blocks 40 and 42 attached to the upper surface of the frame element 22 pivotally support the flare baffle 10 on a pair of axle shafts 44 and 46 by means of two tabs 48 and 50 attached to the flare baffle 10. The rear faces of the bearing blocks 42 and 44 function as the stops 34 and 34' that arrest the upward rotation of the flare baffle 10. The two tabs 48 and 50 attached to the forward, or lower, edge of the flare baffle 10 rotatably engage the axle shafts 44 and 46. The tab 48 has a detent 52 protruding from it toward the inside face 54 of the bearing block 40. The detent 52 is formed, in this embodiment, by bending outwards a part of the tab 48. One feature of the detent 52 to be noted is a ramp 56 between the side of the tab 48 and the apex 57 of the detent 52. The detent 52 is a major element in the means for preventing the flare baffle 10 from bouncing backwards off the stops 34 and 34' into the camera's optical path. Providing the ramp 56 on the detent 52 permits the flare baffle 10 to be purposefully contrarotated into its lowermost position against the forces that, in conjunction with the detent 52, prevent its bouncing due to the impact of it striking the stops 34 and 34'.

The forces needed to rotate the flare baffle 10 upwards are provided by a coil spring 60 wound around the axle shaft 46. One end of the spring 60 connects to the flare baffle 10 and the other end to bearing block 42, the frame member 22, or some other stationary element in the reflex camera 12. Pre-tensioning the spring 60, at its assembly with the other elements of the mechanism, insures that it stores sufficient energy to rapidly rotate the flare baffle 10 upwards when the upward movement of the capping plate 28 releases it. Compressive forces also imparted to the spring 60 at its assembly with the other elements, urge the flare baffle 10 in an axial direction causing the detent 52 to bear against the face 54.

Referring to FIG. 3, it is apparant that the detent 52 slides across the face 54 as the flare baffle 10 rotates upwardly, in the direction of the arrow 62, until the apex 57 reaches the edge 64 of a cavity 66 in the face 54. As the apex 57 passes beyond the edge 64, the compressive energy stored in the spring 60 (not shown in FIG. 5) moves the flare baffle 10 axially in the direction of the arrow 68. Further rotation and axial movement of the flare baffle 10 causes the detent 52 to enter the cavity 66. Then, at its full upward rotation, the flare baffle 10 strikes against the stop 34' as the detent 52 fully engages the cavity 66.

Under the influence of the resulting impact, the flare baffle 10 tends to bounce backwards and contrarotate. However, contra-rotation (rotation opposite the direction indicated by the arrow 62) requires that the ramp 56 slide past the edge 64. To do so requires the flare baffle 10 to move axially, opposite the direction indicated by the arrow 68, and, consequently, to compress the spring 60.

The impact that causes the backward bounce does not impart sufficient energy to the flare baffle 10 for compressing the spring 60. Therefore, the ramp 56 will not slide past the edge 64 and the flare baffle 10, though it might vibrate, cannot rotate backwards and obscure a portion of the camera's field during exposure.

Though the detent 52 and its ramp 56 prevent the flare baffle 10 from rotating backward due to its impact against the stops 34 and 34', it can be lowered. When the capping plate 28 returns to its lower position to protect the next film unit from inadvertent exposure to light, it bears down on a pair of bumpers 72 and 74 on the upper ends of the flare baffle 10. A drive unit (not shown) that operates the capping plate 28 has sufficient power to press the capping plate down, rotating the flare baffle 10 backwards and sliding the ramp 56 past the edge 64 despite the spring 60.

The explanation set forth above explains, as currently understood, the theory of operation of the mechanism that constitutes the present invention for stopping the bouncing of the flare baffle 10 so it will not obscure the field of view.

It can be readily understood that many variations and modifications of the present invention are possible in light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than specifically described herein.

I claim:

1. In a camera having a frame member with an opening in it so a real image can be formed on a photosensitive surface situate behind said frame member; two bearing blocks spaced apart from each other along an edge of said opening; at least one axle shaft, concentric with an axis of rotation extending between said bearing blocks, attached to one of said bearing blocks; a flare baffle mounted so as to rotate on said axle shaft about said axis; a spring for rotating said flare baffle upwards; and a stop for arresting the upward rotation of said flare baffle in a predetermined position, the improvement comprising:

damping means for inhibiting the bouncing of said flare baffle when it strikes said stop.

2. The improved camera described in claim 1, wherein said damping means comprises:

a detent attached to said flare baffle; and a cavity, within an element connected to said frame member, positioned to receive and fully engage said detent when said flare baffle is situate against said stop, said spring mounted for urging said flare baffle in an axial direction and for causing said detent to enter said cavity.

3. The improved camera described in claim 2, wherein said damping means further comprises a ramp, connected to said detent so as to bear against an edge of said cavity, for axially moving said flare baffle to overpower the axial urging of said spring, when said flare baffle is rotated contrary to the direction of rotation effected by said spring, so as to withdraw said detent from said cavity.

4. A damper in a photographic camera to restrain a flare baffle, pivotally mounted between two supports, from bouncing when it strikes against a stop, comprising:
- a cavity in one of said supports;
- a detent attached to said flare baffle and positioned to fully engage said cavity when said flare baffle reaches said stop;
- spring means for urging said detent into full engagement with said cavity; and
- disengaging means, on said detent and bearing against an edge of said cavity, for withdrawing said detent from said cavity when a predetermined force rotates said flare baffle backwards from said stop.

5. The damper described in claim 4 wherein said disengaging means is a ramp integral with said detent.

6. In a camera having a frame member, the improvement comprising:
- a flare baffle pivotably attached to said frame member;
- spring means for rotating said flare baffle upwardly toward a position where it will block unwanted light rays;
- stop means for arresting the rotation of said flare baffle when the edge furthest from its axis of rotation reaches a predetermined position; and
- latching means for minimizing the bouncing of said flare baffle due to its impact against said stop means, said latching means including a detent attached to said flare baffle for rotation therewith, and a cavity in said frame member for receiving said detent as said flare baffle approaches its uppermost position and for inhibiting the contra-rotation of said flare baffle, if it should bounce, wherein said spring means urges said detent into said cavity.

7. A reflex camera, comprising:
- a frame member;
- at least one axle attached to said frame member;
- a flare baffle;
- at least one tab, positioned for pivoting about said axle, attached to said flare baffle;
- stop means, attached to said frame member, for limiting the upward rotation of said flare baffle;
- a cavity formed in a portion of said frame member for receiving a detent;
- spring means for rotating said flare baffle upwards to and against said stop means;
- a detent, attached to said flare baffle and located so as to fully engage said cavity when said flare baffle has rotated to its maximum upward position against said stop means; and
- spring means for urging said detent into said cavity so as to inhibit the contra-rotation of said flare baffle due to its impact against said stop.

* * * * *